United States Patent
Barri et al.

(10) Patent No.: US 7,535,912 B2
(45) Date of Patent: May 19, 2009

(54) BI-LATERAL BANDWIDTH NEGOTIATION UPON DETECTION OF A SHORT-TERM TRAFFIC PATTERN CHANGE

(75) Inventors: Peter Irma August Barri, Bonheiden (BE); Bart Joseph Gerard Pauwels, Tessenderlo (BE); Geert René Taildemand, Oosterzele (BE)

(73) Assignee: Alcatel, Paris (FR)

( * ) Notice: Subject to any disclaimer, the term of this patent is extended or adjusted under 35 U.S.C. 154(b) by 666 days.

(21) Appl. No.: 10/963,647

(22) Filed: Oct. 14, 2004

(65) Prior Publication Data

US 2005/0083919 A1 Apr. 21, 2005

(30) Foreign Application Priority Data

Oct. 21, 2003 (EP) ................................. 03292614

(51) Int. Cl.
*H04L 12/28* (2006.01)
(52) U.S. Cl. .................. 370/395.41; 370/412
(58) Field of Classification Search ................. 370/235, 370/395.21, 395.41, 443, 389, 232, 396, 370/232.1, 412, 413, 419, 423
See application file for complete search history.

(56) References Cited

U.S. PATENT DOCUMENTS

| | | | | |
|---|---|---|---|---|
| 5,748,629 A | * | 5/1998 | Caldara et al. | 370/389 |
| 5,862,126 A | * | 1/1999 | Shah et al. | 370/395.21 |
| 6,493,317 B1 | * | 12/2002 | Ma | 370/237 |
| 6,628,609 B2 | * | 9/2003 | Chapman et al. | 370/229 |
| 6,810,031 B1 | * | 10/2004 | Hegde et al. | 370/351 |
| 7,215,678 B1 | * | 5/2007 | Ahlfors et al. | 370/412 |
| 2003/0103450 A1 | | 6/2003 | Chapman et al. | |
| 2004/0071145 A1 | * | 4/2004 | Ha et al. | 370/395.43 |

FOREIGN PATENT DOCUMENTS

EP 1 195 953 A1 4/2002

* cited by examiner

*Primary Examiner*—Brenda Pham
(74) *Attorney, Agent, or Firm*—Sughrue Mion, PLLC

(57) ABSTRACT

The present invention relates to a switching unit with a low-latency flow control. Queuing parameters of ingress queues, wherein the incoming traffic is backlogged, are measured to detect a short term traffic increase. An additional bandwidth is then negotiated to accommodate this unexpected additional amount of traffic, provided that the corresponding input and output termination modules still dispose of available bandwidth, and disregarding temporarily fairness. This additional bandwidth allows this unexpected additional amount of traffic to be drained from the ingress queue as soon as possible, without waiting for the next system bandwidth fair re-distribution, thereby improving the traffic latency through the switching unit.

6 Claims, 2 Drawing Sheets

BI-LATERAL BANDWIDTH NEGOTIATION UPON DETECTION OF A SHORT-TERM TRAFFIC PATTERN CHANGE

BACKGROUND OF THE INVENTION

The present invention relates to a switching unit comprising:
- a switch core fabric,
- an input termination module coupled to said switch core fabric,
- an output termination module coupled to said switch core fabric, said input termination module comprising:
- at least one ingress queue adapted to backlog data units bound to said output termination module, said switching unit further comprising as forming part of said input termination module and of said switch core fabric, at least point-to-point transmission means adapted to convey data units from at least said at least one ingress queue to at least said output termination module, said at least point-to-point transmission means being considered, with respect to said at least one ingress queue and to said output termination module, as a virtual ingress-to-egress pipe connecting said at least one ingress queue to said output termination module.

Such a switching unit is already known in the art, e.g. from the patent application entitled "Method for Sharing Internal Excess Bandwidth between Output and Input Termination Modules of a Switching Network", No. 00402753, published by the European Patent Office (EPO) on Apr. 10, 2002.

To operate a switching unit efficiently, and to support controlled Quality of Service (QoS) differentiation in a bursty, unpredictable traffic pattern environment, the switching unit has to be complemented with a flow control mechanism. The granularity of the individual amounts of user traffic for which a flow control decision has to be made, the number of destinations and Classes of Service (CoS) to be distinguished, and the state of technology that can be used to implement the flow control, determine the rate and precision of the flow control decisions, and whether this flow control can be realized in a centralized or distributed manner. As the switching unit size and the applied flow granularity grow, either higher processing and communication speed, or more calculation and communication resources are required.

Credit based flow control grants every potential source of traffic in the switching unit a given limited amount of traffic it can allow into the fabric. The source can use the obtained credit at its own discretion. The credit is renewed on demand or on a regular basis. The calculation rule for granting the credit has to be fair over time to avoid giving an unjustified advantage to a particular physical path across the switching unit.

Internal Dynamic Rate-based Flow Control (IDRFC) is a credit based flow control, involving bandwidth negotiation between each and every input and output termination module within a fixed time schedule (IDRFC cycles).

The cited document discloses a switching unit that implements a weighted IDRFC algorithm for sharing an internal excess bandwidth among the input termination modules, according to bandwidth requests from the input termination modules. The bandwidth request and grant related to an input termination module linked by a virtual ingress-to-egress pipe to an output termination module are both calculated for a determined number of relative administrative weights corresponding each to a different CoS, with a different request and a corresponding grant for every weight.

Credit based flow control suffers from latency in the event of abrupt traffic increase. This latency is a consequence of the fixed measurement and calculation time cycles needed to ensure fairness and optimal use of the available bandwidth.

Referring back to IDRFC, 3 IDRFC cycles are necessary for accommodating a traffic pattern change:
- $n^{th}$ cycle: measurement of the incoming traffic at every input termination module,
- $n+1^{th}$ cycle: bandwidth calculation and negotiation between each and every input and output termination modules,
- $n+2^{th}$ cycle: new bandwidth distribution scheme at every input termination module.

If e.g. a step-shaped traffic pattern is applied at a particular input termination port, then incoming data units are backlogged for up to 2 IDRFC cycles before being scheduled towards the switch core fabric, and notwithstanding the fact that bandwidth may be immediately available.

Due to the quasi-linearly increasing calculation time required for increasing numbers of ports and CoS queues per port, scalability will have to be realized on one hand by calculation technology improvements, and on the other hand by increasing the cycle duration, which is the single remaining degree of freedom that allows to relax the calculation speed requirements.

BRIEF SUMMARY OF THE INVENTION

It is an object of the present invention to improve the traffic latency through the switching unit by introducing a short-term action, which accommodates short-term traffic pattern changes, disregarding temporarily fairness.

According to the invention, this object is achieved due to the fact that said input termination module further comprises a traffic analyzer coupled to said at least one ingress queue, and adapted to measure at least one queuing parameter of said at least one ingress queue, and to detect a short-term traffic increase therefrom, and that said switching unit further comprises a bandwidth distribution means coupled to said traffic analyzer, and adapted, upon detection of said short-term traffic increase, to distribute to said virtual ingress-to-egress pipe an amount of a bandwidth remainder available through said at least point-to-point transmission means, thereby increasing bandwidth of said virtual ingress-to-egress pipe.

The amount of incoming traffic is measured over a given period of time at each and every ingress queue. These measurements are used as a basis for estimating for the next period of time the bandwidth needs of the virtual ingress-to-egress pipes whereto this amount of incoming traffic will be forwarded.

The bandwidth of a virtual ingress-to-egress pipe is defined as the number of data units that virtual ingress-to-egress pipe can convey per unit of time.

The bandwidth needs related to the same period of time are backlogged and fairly processed. An amount of the total system bandwidth is fairly distributed to every virtual ingress-to-egress pipe in proportion to their respective bandwidth need.

If a traffic flow entering a particular virtual ingress-to-egress pipe is increasing at a sufficiently large extent then a bandwidth increase for that virtual ingress-to-egress pipe is negotiated separately, disregarding fairness temporarily, and provided that the corresponding input and output termination modules still dispose of available bandwidth, i.e. bandwidth not allocated yet to any virtual ingress-to-egress pipe.

The decision to initiate such a bi-lateral bandwidth increase negotiation may also depend on the phase of the short-term traffic increase with respect to the instant of time from which the system bandwidth will be again fairly redistributed.

A bi-lateral bandwidth decrease negotiation can be similarly initiated upon detection of a short-term traffic decrease, thereby freeing up some system bandwidth, which can be re-used to accommodate a further short-term traffic increase.

A non limiting example of a data unit is an Internet Protocol (IP) datagram conveyed over an IP-based network, such as the Internet.

Another non limiting example of a data unit is a Multi-Path Label Switched (MPLS) packet conveyed over an MPLS-based network, such as a backbone network.

Another non limiting example of a data unit is an Asynchronous Transfer Mode (ATM) cell conveyed over an ATM-based network, such as a broadband public network.

A non limiting example of a switching unit is a IP router adapted to route IP datagrams to the right destination with differentiated service classes (diffserv).

Another non limiting example of a switching unit is a Label Switched Router (LSR) adapted to forward MPLS packets to the right destination with differentiated forwarding treatments.

Another non limiting example of a switching unit is an ATM broadband switch adapted to switch ATM cells to the right destination with a guaranteed QoS.

A non limiting example of at least point-to-point transmission means is a switch core fabric made of modular switching elements, with each a small internal buffer memory, in association with means in the input termination modules for aggregating data units towards the switch core fabric.

A distributed and scalable implementation of the bandwidth distribution means can be thought of, with bandwidth increase request means distributed over every input termination module, and bandwidth increase grant means distributed over every output termination module.

The bandwidth increase request means is coupled to said traffic analyzer and is adapted, upon detection of said short-term traffic increase, to request for said virtual ingress-to-egress pipe a first fraction of an ingress bandwidth remainder available at said input termination module.

The bandwidth increase grant means is coupled to said bandwidth increase request means and is adapted, upon request of said first fraction, to grant to said virtual ingress-to-egress pipe a second fraction of an egress bandwidth remainder available at said output termination module, in proportion to said first fraction.

In another embodiment of the present invention, the queuing parameters used for detecting a short-term traffic increase are any of the following:
  the queue filling level Q, defined as the number of data units backlogged into an ingress queue at a particular instant of time,
  the arrival rate A, defined as the number of data units pushed into an ingress queue per unit of time,
  the schedule rate S, defined as the number of data units pulled out from an ingress queue per unit of time.

The queue filling level Q, the arrival rate A and the schedule rate S satisfies the relation $$\frac{d}{dt}Q(t) = A(t) - S(t).$$

Any $n^{th}$-order time derivative of the queue filling level Q could be used as well for detecting a short-term traffic increase.

In still another embodiment of the present invention, the traffic analyzer compares the queuing parameters to configurable thresholds.

These comparison thresholds may be absolute (e.g., the queue filling level reach a certain amount), or relative (e.g., the arrival rate is 25% higher than the schedule rate).

In still another embodiment of the present invention, the additional bandwidth necessary for accommodating a short-term traffic increase is a fixed amount. In another embodiment yet, it is a function of the traffic increase, as measured by the corresponding queuing parameters.

In still another embodiment of the present invention, a limited attempt is made to assure fairness in distributing the bandwidth remainder to multiple quasi-simultaneously changing flows.

This object is achieved due to the fact that said bandwidth increase grant means is further adapted to backlog, during a short pre-determined period of time, at least two requests for a bandwidth increase from respective ones of at least two input termination modules towards said output termination module, and to grant said egress bandwidth remainder fairly over said at least two input termination modules.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein:

DETAILED DESCRIPTION OF THE INVENTION

The switching unit SU comprises the following functional blocks:
  a switch core fabric SW (see FIGS. 1 and 2),
  N input termination modules I1 to IN (see FIGS. 1 and 2), N being a non-null positive integer,
  M output termination modules O1 to OM (see FIGS. 1 and 2), M being a non-null positive integer.

The input termination modules I1 to IN are coupled to ingress access ports of the switch core fabric SW. The output termination modules O1 to OM are coupled to egress access ports of the switch core fabric SW.

The switching unit SU is adapted to differentiate non real time traffic from real time traffic, and to give precedence through the switching unit to the latter.

The switch core fabric SW is a Multi-Path Self Routing (MPSR) switch, adapted to forward fixed length packets from any ingress access port to any egress access port. This is achieved by appending internal routing data to the transiting packets.

Figure 1:
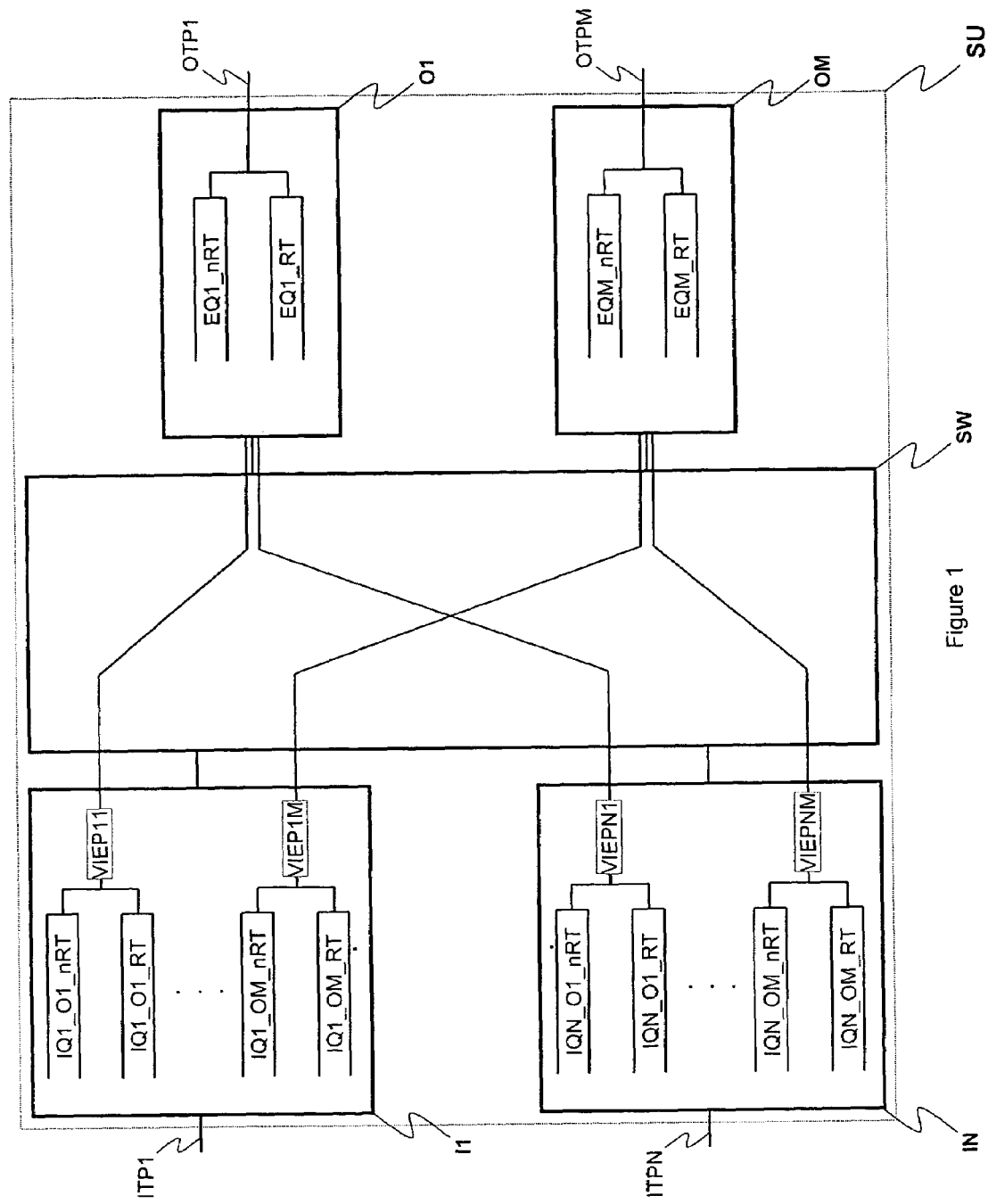
FIG. 1 represents a switching unit SU according to the prior art.
Figure 2:
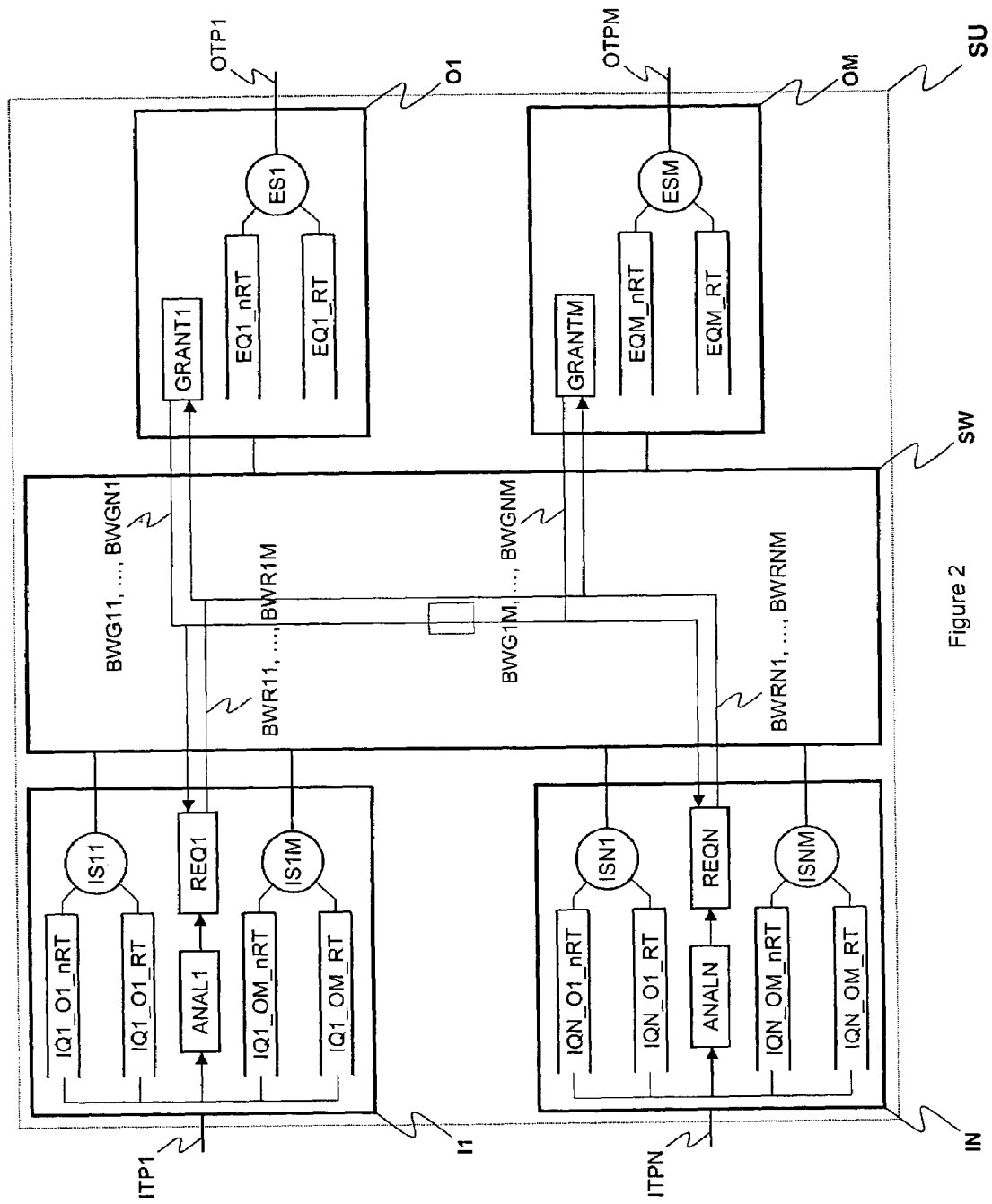
FIG. 2 represents the same switching unit according to the present invention.

The input termination module In, n being an index ranging from 1 to N, comprises the following functional blocks:
- an input termination port ITPn (see FIGS. 1 and 2),
- 2×M ingress queues IQn_O1_nRT to IQn_OM_nRT, and IQn_O1_RT to IQn_OM_RT (see FIGS. 1 and 2),
- M ingress schedulers ISn1 to ISnM (see FIG. 2),
- a traffic analyzer ANALn (see FIG. 2),
- a bandwidth increase request means REQn (see FIG. 2).

The ingress schedulers ISnm is coupled to the ingress queues IQn_Om_nRT and IQn_Om_RT. The traffic analyzer ANALn is coupled to the ingress queues IQn_O1_nRT to IQn_OM_nRT, and IQn_O1_RT to IQn_OM_RT. The bandwidth increase request means REQn is coupled to the traffic analyzer ANALn.

The output termination module Om, m being an index ranging from 1 to M, comprises the following functional blocks:
- an output termination port OTPm (see FIGS. 1 and 2),
- 2 egress queues EQm_nRT and EQm_RT (see FIGS. 1 and 2),
- an egress scheduler ESm (see FIG. 2),
- a bandwidth increase grant means GRANTm (see FIG. 2).

The egress scheduler ESm is coupled to the output termination port OTPm and to the egress queues EQm_nRT and EQm_RT. The bandwidth increase grant means GRANTm is externally coupled to the bandwidth increase request means REQ1 to REQN.

The input termination port In is adapted to terminate an electrical or optical signal from a peer switching unit, such as a Gigabit Ethernet signal, and to decode incoming data units in a format suitable for their processing within the switching unit SU.

The output termination port Om is adapted to originate an electrical or optical signal towards a peer switching unit, and to encode outgoing data units in a format suitable for their transmission towards the peer switching unit.

The ingress queues IQn_O1_nRT to IQn_OM_nRT, respectively IQn_O1_RT to IQn_OM_RT, are First In First Out (FIFO) queues adapted to backlog non real time, respectively real time, incoming data units bound to respective ones of the output termination modules O1 to OM.

The egress queue EQm_nRT, respectively EQm_RT, are FIFO queues adapted to backlog non real time, respectively real time, outgoing data units.

The ingress schedulers ISnm is adapted to schedule data units from the ingress queues IQn_Om_nRT and IQn_Om_RT towards the switch core fabric SW in proportion to their respective service share.

The egress scheduler ESm is adapted to schedule data units from the egress queues EQm_nRT and EQm_RT towards the output termination port OTPm in proportion to their respective service share.

In a preferred embodiment of the present invention, the ingress scheduler ISnm and the egress scheduler ESm are Weighted Fair Queuing (WFQ) work-conserving schedulers. Each queue is allotted a service share or weight: the higher the weight, the more data units are scheduled from that queue.

The input termination module In further accommodates fragmenting means (not shown) for fragmenting incoming data units into fixed length data packets, at some point while transiting through the input termination module towards the switch core fabric.

The output termination module Om further accommodates re-assembly means (not shown) for re-assembling fixed length data packets from the switch core fabric SW into variable length data units, at some place while transiting through the output termination module towards the output termination port.

A credit based flow control, such as IDRFC, is assumed to redistribute fairly the system bandwidth every T1 seconds.

The traffic analyzer ANALn is adapted:
- to count the number of data units backlogged into each of the ingress queues IQn_O1_nRT to IQn_OM_nRT, and IQn_O1_RT to IQn_OM_RT, thereby maintaining 2×M queue filling levels Q_IQn_O1_nRT to Q_IQn_OM_nRT, and Q_IQn_O1_RT to Q_IQn_OM_RT, respectively,
- to count the number of data units pushed into each of the ingress queues IQn_O1_nRT to IQn_OM_nRT, and IQn_O1_RT to IQn_OM_RT, since the last system bandwidth fair re-distribution occurred, thereby maintaining 2×M counters a_IQn_O1_nRT to a_IQn_OM_nRT, and a_IQn_O1_RT to a_IQn_OM_RT, respectively.

An average arrival rate A_IQn_Om_nRT, respectively A_IQn_Om_RT, of the ingress queue IQn_Om_nRT, respectively IQn_Om_RT, since the last system bandwidth fair re-distribution occurred, is determined as follows:

$$A\_IQn\_Om\_nRT = \frac{a\_IQn\_Om\_nRT}{t},$$

respectively $$A\_IQn\_Om\_RT = \frac{a\_IQn\_Om\_RT}{t},$$

where t denotes the time elapsed since the last system bandwidth fair re-distribution occurred.

The schedule rate S_IQn_Om_nRT, respectively S_IQn_Om_RT, of the ingress queue IQn_Om_nRT, respectively IQn_Om_RT, is determined from the service share allotted to that ingress queue, from the service rate allotted the egress scheduler ISnm, and from the scheduling algorithm, presently WFQ.

The traffic analyzer ANALn is further adapted:
- to compare, every T2 seconds, with 1/T2 being a multiple integer of 1/T1, the queue filling levels Q_IQn_O1_nRT to Q_IQn_OM_nRT, and Q_IQn_O1_RT to Q_IQn_OM_RT to respective ones of configurable thresholds T_IQn_O1_nRT to T_IQn_OM_nRT, and T_IQn_O1_RT to T_IQn_OM_RT,
- to trigger the bandwidth increase request means REQn whenever any of the thresholds T_IQn_O1_nRT to T_IQn_OM_nRT, and T_IQn_O1_RT to T_IQn_OM_RT, is reached.

The trigger is sent along with the identity of the ingress queue, the threshold of which has been reached, and with the queue filling level, the average arrival rate and the schedule rate of that ingress queue as determined by the traffic analyzer ANALn.

A typical value for T_IQn_Om_nRT, respectively T_IQn_Om_RT, is 80% of the size of the ingress queue IQn_Om_nRT, respectively IQn_Om_RT.

M virtual ingress-to-egress pipes VIEPn1 to VIEPnM are assumed to connect the ingress queues IQn_O1_nRT to IQn_OM_nRT, and IQn_O1_RT to IQn_OM_RT, to respective ones of the output termination modules O1 to OM (see FIG. 1).

The bandwidth increase request means REQn is adapted:
to determine, upon trigger from the traffic analyzer ANALn related to any of the ingress queues IQn_Om_nRT and IQn_Om_RT, an additional bandwidth needs BWNnm for the virtual ingress-to-egress pipe VIEPnm,
to determine an additional bandwidth request BWRnm for that virtual ingress-to-egress pipe,
to send the so-determined additional bandwidth request to the appropriate output termination module.

The additional bandwidth needs BWNnm is determined as follows:

If the trigger is related to the ingress queue IQn_Om_nRT then $$BWNnm = K \times \left(A\_IQn\_Om\_nRT - S\_IQn\_Om\_nRT + \frac{Q\_IQn\_Om\_nRT}{(T1-t)}\right).$$

If the trigger is related to the ingress queue IQn_Om_RT then $$BWNnm = K \times \left(A\_IQn\_Om\_RT - S\_IQn\_Om\_RT + \frac{Q\_IQn\_Om\_RT}{(T1-t)}\right).$$

K is a scaling factor, greater than or equal to 1. The higher K, the quicker the ingress queue is going to be drained off, the lower the traffic latency, the more consumed bandwidth. A typical value for K is 1.20.

Let BWRIn denote an ingress bandwidth remainder available at the input termination module In, and not allocated yet to any virtual ingress-to-egress pipe.

In a preferred embodiment of the present invention, BWRIn is determined as being the bandwidth remainder available at the ingress access port via which the input termination module In is coupled to the switch core fabric SW.

The additional bandwidth request BWRnm is determined as follows:
If BWNnm≦BWRIn then BWRnm=BWNnm.
If BWNnm>BWRIn then BWRnm=BWRIn.

The bandwidth increase grant means GRANTm is adapted:
to determine an additional bandwidth grant BWGnm, upon receipt of an additional bandwidth request BWRnm,
to send the so-determined additional bandwidth grant to the appropriate input termination module.

Let BWREm denote an egress bandwidth remainder available at the output termination module Om, and not allocated yet to any virtual ingress-to-egress pipe.

In a preferred embodiment of the present invention, BWREm is determined as being the bandwidth remainder available at the egress access port via which the output termination module Om is coupled to the switch core fabric SW.

The additional bandwidth grant BWGnm is determined as follows:
If BWRnm≦BWREm then BWGnm=BWRnm.
If BWRnm>BWREm then BWGnm=BWREm.

The egress bandwidth remainder is updated accordingly: BWREm'=BWREm−BWGnm.

The bandwidth increase request means REQn is further adapted, upon receipt of an additional bandwidth grant BWGnm:
to update the ingress bandwidth remainder accordingly: BWRIn'=BWRIn−BWGnm,
to increase the service rate of the scheduler ISnm with the additional bandwidth grant BWGnm,
to put this new service rate in force, thereby achieving the object of the present invention.

In an alternative embodiment of the present invention, the bandwidth increase grant means GRANTm is further adapted to backlog requests for an additional bandwidth during T3 seconds.

T3 should be chosen small enough with respect to T1, such that the total time needed to buffer and process those requests is kept small enough with respect to the desired traffic latency.

Upon receipt of the first additional bandwidth request, the bandwidth increase grant means GRANTm starts a timer, the duration of which is T3 seconds, and stores the pieces of information necessary for processing that request subsequently.

Further additional bandwidth requests are similarly backlogged until the timer elapses.

Upon timeout, the bandwidth increase grant means GRANTm shares the egress bandwidth remainder BWREm fairly over all the input termination modules that ask for an additional bandwidth.

In still an alternative embodiment of the present invention, the bandwidth increase request means REQn does not initiate such a bi-lateral bandwidth increase negotiation if the elapsed time t is too close from T1, e.g. if t>0.80×T1.

In still an alternative embodiment of the present invention, an increase of the existing granted bandwidth from an input termination module In to an output termination module Om is requested, and possibly granted.

The interface between the bandwidth increase request means REQn and the bandwidth increase grant means GRANTm is changed accordingly, so are their functionality.

In still an alternative embodiment of the present invention, the traffic analyzer ANALn is further adapted to detect a short-term traffic decrease, e.g. by comparing the arrival rate A_IQn_Om_nRT, respectively A_IQn_Om_RT, to the schedule rate S_IQn_Om_nRT, respectively S_IQn_Om_RT.

If the arrival rate is too low, e.g. if A_IQn_Om_nRT<0.80× S_IQn_Om_nRT, respectively if A_IQn_Om_RT<0.80× S_IQn_Om_RT, then a bi-lateral bandwidth decrease negotiation is similarly carried out to release this unused bandwidth, e.g. which is equal to S_IQn_Om_nRT− A_IQn_Om_nRT=0.20×S_IQn_Om_nRT, respectively S_IQn_Om_RT−A_IQn_Om_RT=0.20×S_IQn_Om_RT.

In still an alternative embodiment of the present invention, the switching unit implements another traffic differentiation, e.g. based upon the IP differentiated service classes (diffserv).

The input and output termination modules accommodate as many queues as there are traffic classes to differentiate, each of these queues being monitored according to the present invention.

In still an alternative embodiment of the present invention, the bandwidth increase request means REQ1 to REQN, and/or the bandwidth increase grant means GRANT1 to GRANTM are partly/wholly centrally implemented.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A switching unit comprising:
a switch core fabric,
an input termination module coupled to said switch core fabric,
an output termination module coupled to said switch core fabric,
said input termination module comprising:
at least one ingress queue that backlogs data units bound to said output termination module,
said switching unit further comprising as forming part of said input termination module and of said switch core fabric, at least point-to-point transmission means that conveys data units from at least said at least one ingress queue to at least said output termination module, said at least point-to-point transmission means being assimilated, with respect to said at least one ingress queue and to said output termination module, to a virtual ingress-to-egress pipe connecting said at least one ingress queue to said output termination module,
wherein said input termination module further comprises a traffic analyzer coupled to said at least one ingress queue, and that measures at least one queuing parameter of said at least one ingress queue, and that detects a short-term traffic increase therefrom,
and wherein said switching unit further comprises a bandwidth distribution means coupled to said traffic analyzer, and that, upon detection of said short-term traffic increase, temporarily disregards fairness while distributing to said virtual ingress-to-egress pipe an amount of a bandwidth remainder available through said at least point-to-point transmission means, thereby increasing bandwidth of said virtual ingress-to-egress pipe.

2. A switching unit according to claim 1, wherein:
said input termination module further comprises, as forming part of said bandwidth distribution means, a bandwidth increase request means coupled to said traffic analyzer, and, upon detection of said short-term traffic increase, requests for said virtual ingress-to-egress pipe a first fraction of an ingress bandwidth remainder available at said input termination module,
said output termination module further comprises, as forming part of said bandwidth distribution means, a bandwidth increase grant means coupled to said bandwidth increase request means, and that, upon request of said first fraction, grants to said virtual ingress-to-egress pipe a second fraction of an egress bandwidth remainder available at said output termination module, in proportion to said first fraction.

3. A switching unit according to claim 1, wherein said at least one queuing parameter includes a queue filling level of any of said at least one ingress queue, or an arrival rate of any of said at least one ingress queue, or a schedule rate of any of said at least one ingress queue, or an any-order time derivative of said queue filling level.

4. A switching unit according to claim 1, wherein said traffic analyzer detects said short-term traffic increase by comparing said at least one queuing parameters to respective ones of at least one threshold.

5. A switching unit according to claim 1, wherein said amount is a function of said at least one queuing parameter.

6. A switching unit according to claim 2, wherein said bandwidth increase grant means backlogs, during a short pre-determined period of time, at least two requests for a bandwidth increase from respective ones of at least two input termination modules towards said output termination module, and grants said egress bandwidth remainder fairly over said at least two input termination modules.

* * * * *